United States Patent
Xiong et al.

(10) Patent No.: US 11,067,997 B2
(45) Date of Patent: Jul. 20, 2021

(54) SIMULTANEOUS LOCALIZATION AND MAPPING METHODS OF MOBILE ROBOT IN MOTION AREA

(71) Applicant: UBTECH Robotics Corp, Shenzhen (CN)

(72) Inventors: Youjun Xiong, Shenzhen (CN); Xi Luo, Shenzhen (CN); Sotirios Stasinopoulos, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 142 days.

(21) Appl. No.: 16/236,364

(22) Filed: Dec. 29, 2018

(65) Prior Publication Data

US 2019/0278288 A1 Sep. 12, 2019

(30) Foreign Application Priority Data

Mar. 8, 2018 (CN) .......................... 201810189296.4

(51) Int. Cl.
*G05D 1/02* (2020.01)
*G06T 7/73* (2017.01)
(Continued)

(52) U.S. Cl.
CPC .......... *G05D 1/0234* (2013.01); *G05D 1/0246* (2013.01); *G06K 7/10722* (2013.01);
(Continued)

(58) Field of Classification Search
CPC .. G05D 1/0234; G05D 1/0246; G05D 1/0088; G05D 2201/0217; G05D 1/0274;
(Continued)

(56) References Cited

U.S. PATENT DOCUMENTS

2006/0293810 A1* 12/2006 Nakamoto ........... G05D 1/0234
701/28
2017/0029213 A1* 2/2017 Johnson ............... G05D 1/0274

FOREIGN PATENT DOCUMENTS

CN          106003052 A     10/2016
CN          107180215 A      9/2017

OTHER PUBLICATIONS

Stathakis, Alexandras "Vision-Based Localization using Reliable Fiducial Markers"; Ottawa-Carleton Institute for Electrical and Computer Engineering School of Electrical Engineering and Computer Science University of Ottawa; Dec. 2011.*

* cited by examiner

*Primary Examiner* — Brian P Sweeney

(57) ABSTRACT

The present disclosure provides a map generation method, localization method, and simultaneous localization and mapping method. The method includes: recognizing fiducial markers in the motion area; taking a position as origin of a global coordinate system of the robot, and obtaining pose information of the fiducial markers; the robot moving to a next position, recognizing the fiducial markers with determined coordinate information and underdetermined coordinate information respectively, and obtaining pose information of the fiducial marker of the undetermined coordinate information with respect to the origin based on that of the determined coordinate information; repeating the previous step until the pose information of all the fiducial markers are obtained; and generating a marker map associated with coordinate information of all fiducial markers. The method is capable of generating a map of the motion area through the fiducial markers and further realizing autonomous localization.

13 Claims, 17 Drawing Sheets

Fiducial Marker on Wall

(51) Int. Cl.
  *G06K 7/14* (2006.01)
  *G06K 7/10* (2006.01)
  *G05D 1/00* (2006.01)
(52) U.S. Cl.
  CPC .............. *G06K 7/1417* (2013.01); *G06T 7/74* (2017.01); *G05D 1/0088* (2013.01); *G05D 2201/0217* (2013.01); *G06T 2207/30204* (2013.01)
(58) Field of Classification Search
  CPC ............. G06T 7/74; G06T 2207/30204; G06T 2207/30244; G06T 2207/30252; G06T 7/73; G06T 7/579; G06K 7/10722; G06K 7/1417; G01C 21/12
  See application file for complete search history.

Fiducial Marker on Stairs

FROINT VIEW

Example of a humanoid robot

Robot coordinate system

SIMULTANEOUS LOCALIZATION AND MAPPING METHODS OF MOBILE ROBOT IN MOTION AREA

CROSS REFERENCE TO RELATED APPLICATIONS

This application claims priority to Chinese Patent Application No. 201810189296.4, filed Mar. 8, 2018, which is hereby incorporated by reference herein as if set forth in its entirety.

BACKGROUND

1. Technical Field

The present disclosure relates to mobile robot simultaneous localization and mapping techniques, and particularly to a mapping method, localization method, and simultaneous localization and mapping method for a mobile robot in a motion area.

2. Description of Related Art

Mobile robots have been more and more used in our life, such as vacuum cleaners, goods transporting and security monitoring. They can also perform tasks in dangerous environments such as radiation, chemical exposure, biohazards, collapsed buildings and etc. However, traditional mobile robots are not capable of autonomously localization and/or mapping in a unknown environment. The term SLAM is stated with the process of a mobile robot that can build up a map of an unknown environment while at the same time use this generated map to compute it's own location. Localization methods deal with the problem that a robot determines its position with respect to its surrounding environments. Mapping methods deal with the problem that a robot can build up the map of its surrounding environments. The environments maybe are too complex to generate manually or not maintain static. Therefore the robot needs to frequently update its map so that the map can accurately describe its environments.

The SLAM process includes multiple subsections such as landmark extraction, data association, state (position) estimation, state (position) update and landmark update. SLAM techniques have been solved and implemented by several different methods. In the outdoor, a robot can be positioned by GPS (global positioning system) and map data to realize precise localization and then complete the tasks in navigation and path planning. In an indoor environment, GPS signal will be weak, while equipment such as laser radar is usually adopted for its easy implementation and high precision. However, the cost of laser radar is very high, which leads to that total cost of mobile robot is too high.

BRIEF DESCRIPTION OF THE DRAWINGS

To describe the technical schemes in these embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

In order to make those skilled in the art to better understand the technical solutions of the present disclosure, the embodiments of the robot of the present disclosure will be further described in detail below with reference to the accompanying drawings and specific embodiments.

In the present disclosure, a mobile robot can autonomously generate the map in its motion area by using fiducial markers, and realizes self-localization and navigation within the map area. In which, the motion area may be an indoor area such as a shopping mall, a factory, and a warehouse. When implementing the methods of the present disclosure, a plurality of fiducial markers need to be disposed in the motion area. When the robot at the initial position of motion area, at least two of the fiducial markers need to be observed and recognized. The initial position is considered as an initial origin of a global coordinate system of the robot as well as the origin of robot map, and at the same time the poses of two fiducial markers with respect to the origin, that is, the poses of the two fiducial markers in the global coordinate system of the robot map can be obtained. When robot moves to other position, the robot position can be determined if the poses of at least two fiducial markers have been obtained and at least one of the poses of fiducial markers has been determined at previous step. In this way, the undetermined coordinate of the fiducial marker can be calculated by the fiducial marker with determined coordinate with respect to the origin of the map. Repeat this step until all the poses of fiducial markers in motion area with respect to the origin of robot map have been calculated. A map associated with fiducial markers is built up based on all the obtained pose information, thereby obtaining the map which is based on the global coordinate system of the robot. The pose information covers the position in Cartesian coordinate system (X, Y, Z) and orientation which can be represented by Euler angles ($\theta_x$, $\theta_y$, $\theta_z$). Here $\theta_x$ represents the orientation rotated an angle θ around x axis.

Figure 1:
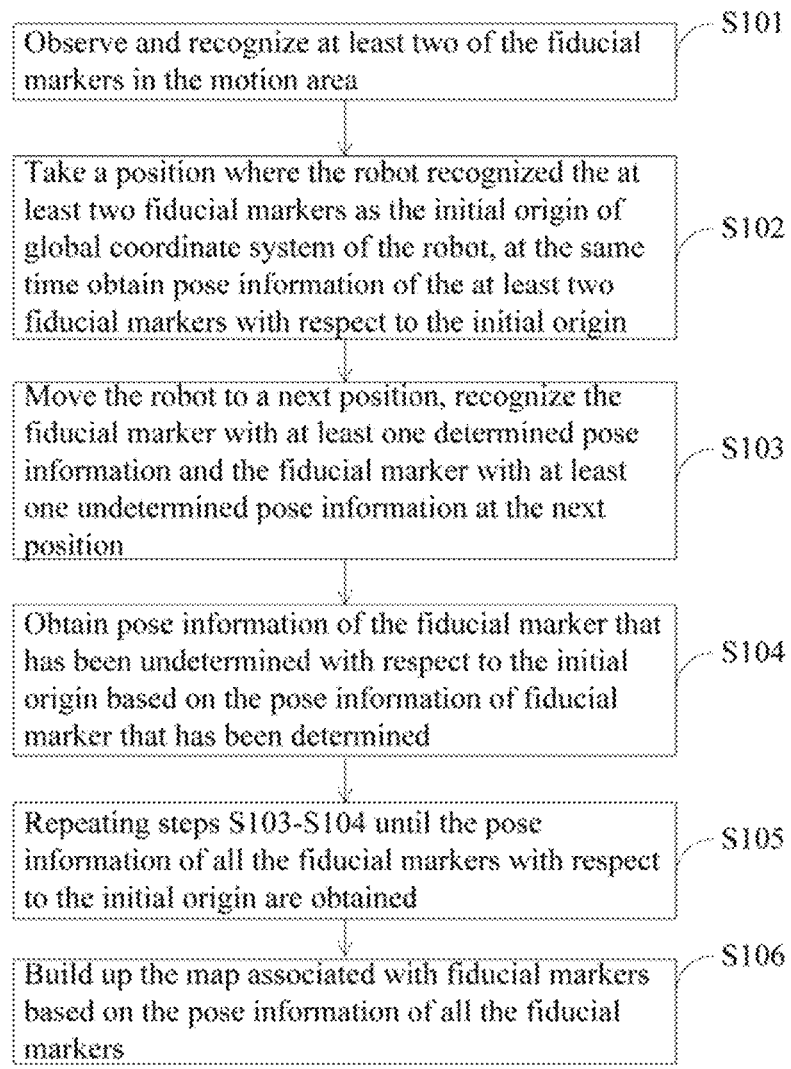
FIG. 1 is a flow chart of a map generation method for a robot in a motion area according to an embodiment of the present disclosure.
Figure 2:
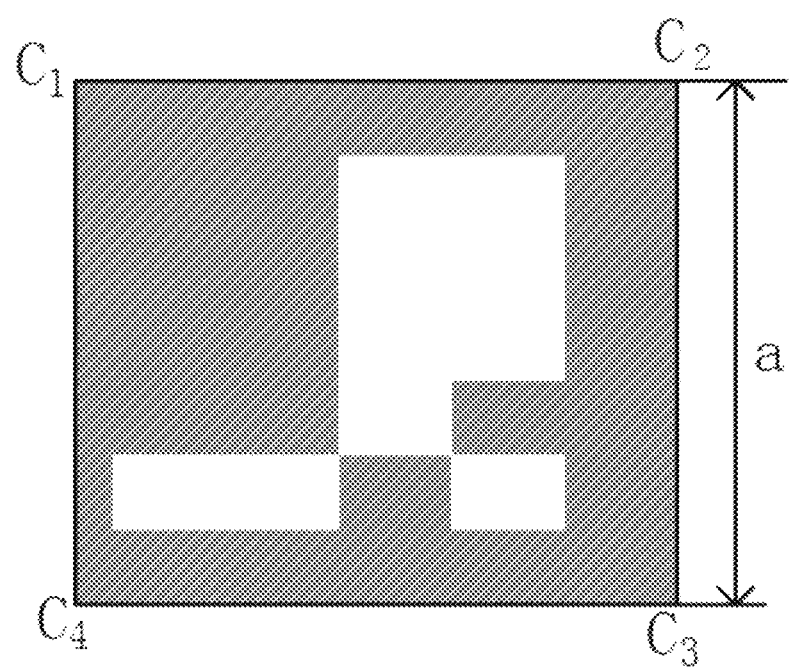
FIG. 2 is a schematic diagram of a fiducial marker in the map generation method shown in FIG. 1.
Figure 3:
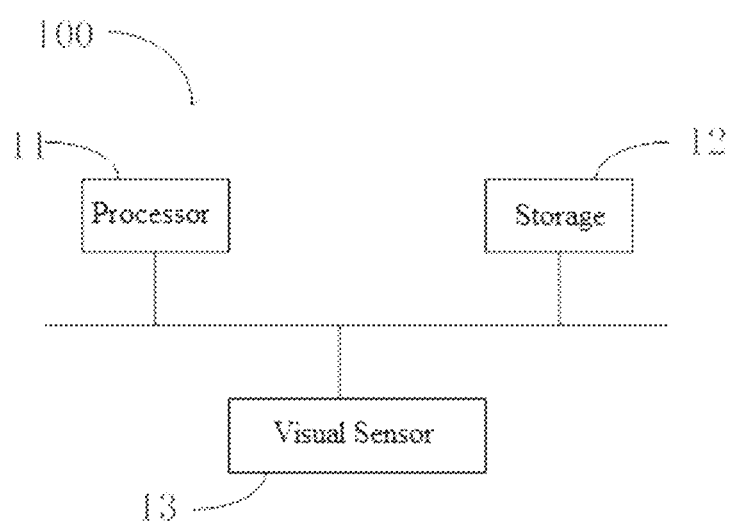
FIG. 3 is a schematic block diagram of a robot according to an embodiment of the present disclosure.

FIG. 1 is a flow chart of a map generation method for a robot in a motion area according to an embodiment of the present disclosure. In this embodiment, a motion area is disposed with a plurality of fiducial markers, and the method is a computer-implemented method executable for a processor. The fiducial marker may be landmark having identifiable features, where the vertices of the landmark may be detected and used to calculate pose information of the fiducial marker with respect to the robot. The fiducial marker may be a square pattern, for example, an Aruco code or an AprilTag code. FIG. 2 is a schematic diagram of a fiducial marker in the map generation method shown in FIG. 1. As shown in FIG. 2, four vertices of the black side of the square marker can be detected so as to calculate the relative pose of the fiducial marker with respect to the robot. Inside the square marker is a binary coding matrix that determines identification information of the fiducial marker. The above-mentioned methods can be applied to a robot, and the logic process of the method is represented by a computer program, which is specifically implemented by the hardware of the robot. Therefore, the present disclosure also provides a robot. FIG. 3 is a schematic block diagram of a robot according to an embodiment of the present disclosure. As shown in FIG. 3, in this embodiment, a robot 100 includes a processor 11, and a storage 12. The storage 12 (e.g., a memory) stores a computer program that the processor 11 executes to implement the above mentioned method. The robot 100 may further include a visual sensor 13, and recognizes the fiducial marker through the visual sensor 13. The robot 100 can implement the localization and the map generation based on the recognition of fiducial markers.

When the method is adopted to build up a map, it is necessary to provide a plurality of fiducial marks in the motion area. In the motion area, a plurality of fiducial markers are disposed on the ground. When the fiducial markers are only disposed on the ground, a two-dimensional marker map may be built up; when the fiducial markers are disposed on both the ground and the wall, a three-dimensional marker map may be built up.

Figure 4A:
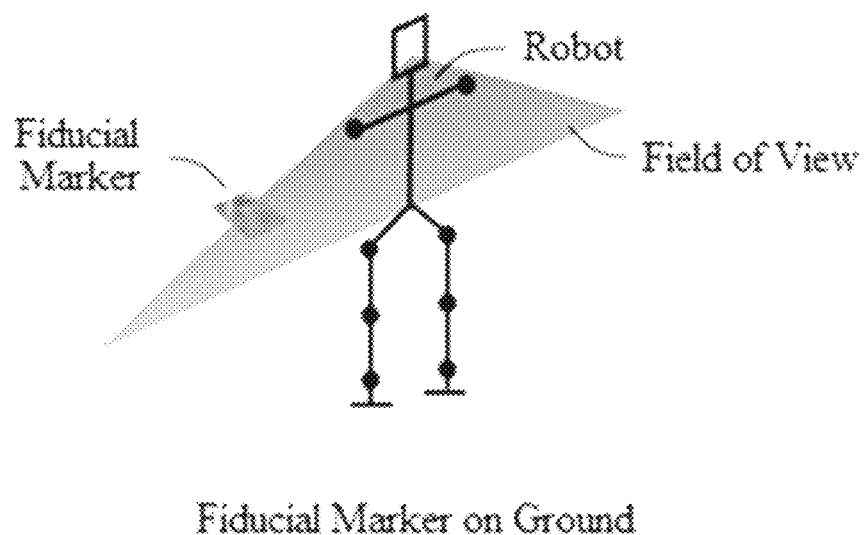
FIG. 4 is a schematic diagram of a fiducial marker disposed on the ground in the map generation method shown in FIG. 1.
FIG. 4B is a schematic diagram of a fiducial marker disposed on a wall in the map generation method shown in FIG. 1.
FIG. 4C is a schematic diagram of a fiducial marker disposed on the stairs in the map generation method shown in FIG. 1.
Figure 4B:
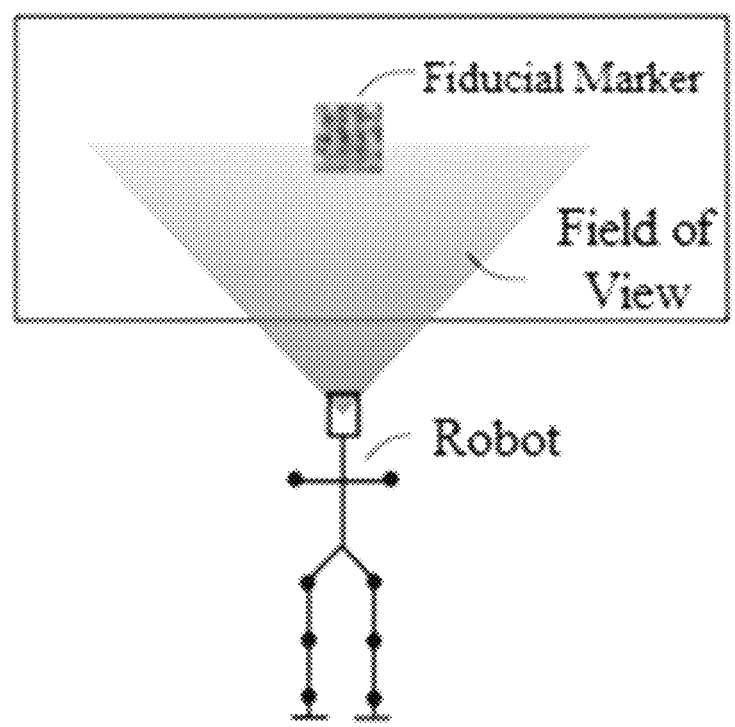
Figure 4C:
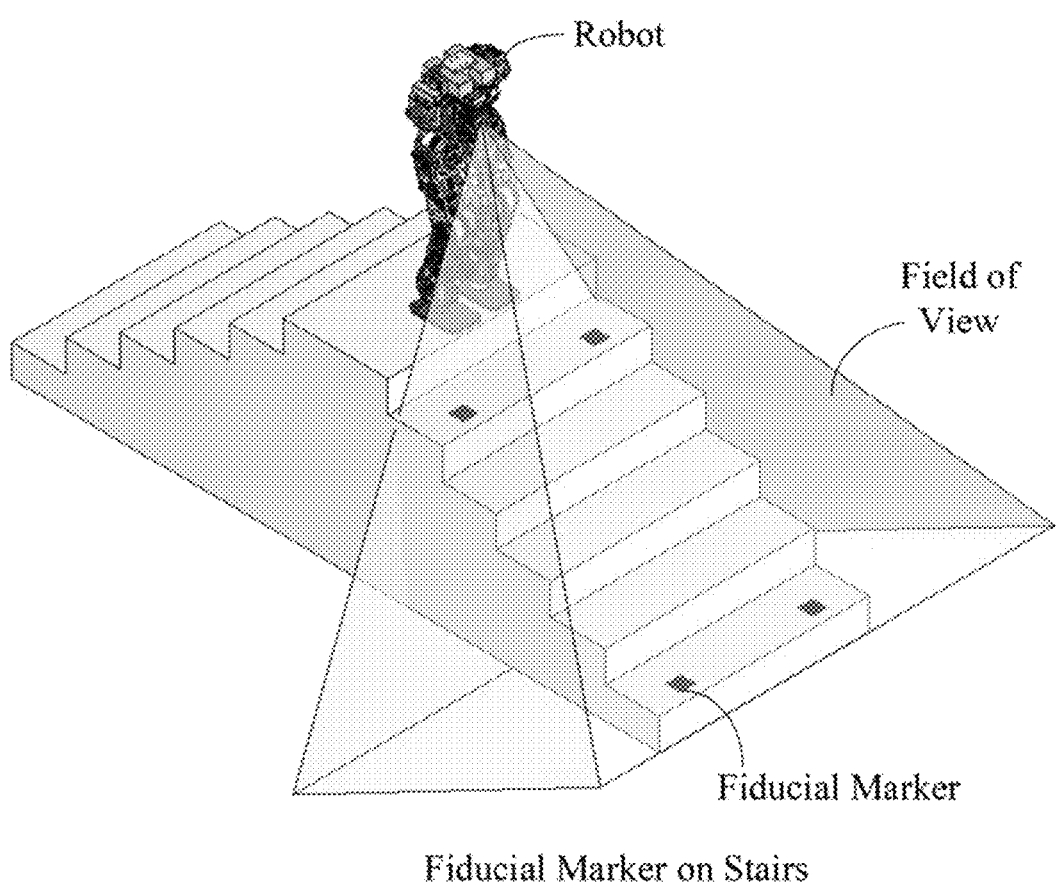

In practical applications, the fiducial markers can be disposed in various positions within the motion area. For example when generating a map for a warehouse, the fiducial markers can be disposed on shelves; and when generating a map for a mall, the fiducial markers can be disposed on stairs, thereby building up the map for a multi-floor space. For details, please refer to FIG. 4A, FIG. 4B and FIG. 4C. FIG. 4A is a schematic diagram of a fiducial marker disposed on the ground in the map generation method shown in FIG. 1; FIG. 4B is a schematic diagram of a fiducial marker disposed on a wall in the map generation method shown in FIG. 1; FIG. 4C is a schematic diagram of a fiducial marker disposed on stairs in the map generation method shown in FIG. 1. As shown in FIG. 4A, FIG. 4B and FIG. 4C, the fiducial markers can be disposed in different manners in the map generation method shown in FIG. 1.

In this embodiment, since the generation of the marker map is performed based on the fiducial markers disposed in the motion area, the more fiducial markers are disposed in the motion area, the more comprehensive and accurate the generated marker map is. As shown in FIG. 1, the map generation method includes the following steps.

S101: observing and recognizing at least two of the fiducial markers in the motion area.

S102: taking a position where the robot recognized at least two fiducial markers as an initial origin of a global coordinate system of the robot, at the same time obtaining the pose information of the at least two fiducial markers with respect to the initial origin.

Figure 5:
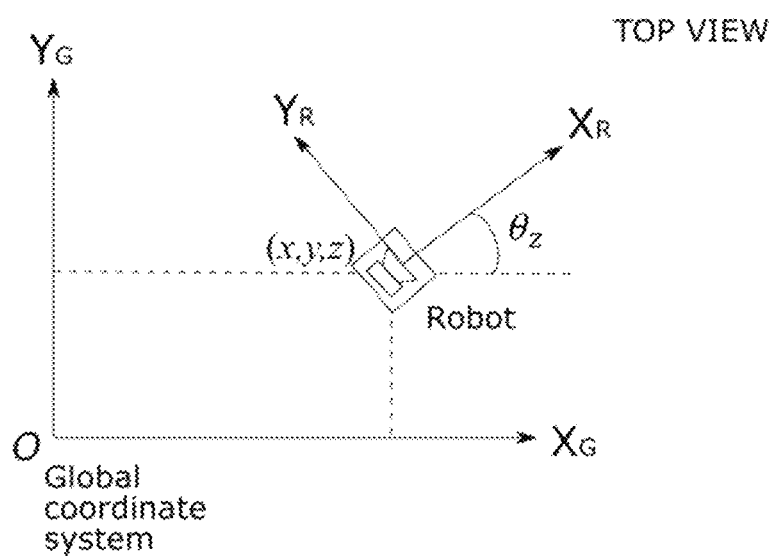
FIG. 5 is a schematic diagram of pose information of a robot in a global coordinate system according to an embodiment of the present disclosure.

In this embodiment, step S101 recognizes at least two fiducial markers first, and then current position of the robot at which at least two fiducial markers are recognized is used as the initial origin of the robot map, and then the pose information of two fiducial markers in the global coordinate system of the robot, that is, the initial origin can be determined based on the pose information of two fiducial markers with respect to the robot. The pose information mentioned here includes the position in Cartesian coordinate system (X, Y, Z) and orientation which can be represented by Euler angles ($\theta_x$, $\theta_y$, $\theta_z$). FIG. 5 is a schematic diagram of pose information of a robot in a global coordinate system according to an embodiment of the present disclosure. Here with the top view of robot, assume that the robot position is (x, y, z) and the Z axis of global coordinate system is perpendicular away from the ground. Then the orientation angle can be represented by $\theta_z$.

In this embodiment, the robot may be equipped with a visual sensor. The visual sensor can be a monocular camera, a binocular camera, or a plurality of cameras. The fiducial marker is observed and recognized by the visual sensor to obtain the pose information of fiducial marker with respect to the visual sensor, and the coordinate of fiducial marker with respect to global coordinate system of robot as well as the map can be therefore obtained.

In this embodiment, the adopted fiducial marker is an Aruco marker, and the inside of the marker is a binary coding matrix. The visual sensor can obtain the pose information of the fiducial marker with respect to the visual sensor when recognizing the fiducial marker, and can also obtain identification information of the fiducial marker at the same time.

The pose information can be obtained by recognizing the four vertices of the black wide side of the fiducial marker, thereby obtaining 2D coordinate information of the four vertices in an image captured by the visual sensor. Then, the three-dimensional actual coordinate of the fiducial marker is mapped into the two-dimensional image coordinate using internal and external parameter matrix information of the visual sensor according to the actual size such as the length of the fiducial marker, and a transformation matrix of the coordinate system of the fiducial marker with respect to the coordinate system of the visual sensor is obtained, thereby obtaining the pose information of the fiducial marker with respect to the visual sensor.

In one embodiment, as shown in FIG. 2, assuming that the actual length of an Aruco marker image is a, the 3D actual coordinates of the four vertices ($C_1$, $C_2$, $C_3$, $C_4$) of the marker in the Amen marker coordinate system are respectively $$\left(-\frac{a}{2}, \frac{a}{2}, 0\right), \left(\frac{a}{2}, \frac{a}{2}, 0\right), \left(\frac{a}{2}, -\frac{a}{2}, 0\right), \text{ and } \left(-\frac{a}{2}, -\frac{a}{2}, 0\right).$$

By solvePnP formula, with four vertices coordinate information, the 2D coordinate information detected in the image, and the internal and external parameter matrix information of the visual sensor, the pose information of the coordinate system of the marker with respect to the visual sensor can be obtained. In the coordinate system of the fiducial marker, a center point of the four vertices is assigned as the origin O, the plane where the image located is assigned as the XOY plane, while the direction pointing to the visual sensor is assigned as Z axis. The transformation includes a relative translation vector and a relative rotation vector, where the relative rotation vector can be used to calculate the corresponding relative, rotation matrix through Rodrigues formula. The above formula can be obtained according to the following formula.

$$s \begin{bmatrix} u \\ v \\ 1 \end{bmatrix} = A \begin{bmatrix} R & t \\ 0 & 1 \end{bmatrix} \begin{bmatrix} X \\ Y \\ Z \\ 1 \end{bmatrix};$$

where (u, v) is 2D coordinates of the center of the marker detected in the image, (X, Y, Z) is the actual 3D coordinates of the center of the marker, A is the inner parameter matrix of the visual sensor, and R and t are relative rotation vector and relative translation vector of visual sensors respectively. The internal parameter matrix of visual sensor can be obtained by camera parameter calibration process.

The identification information can be obtained by: performing a binarization process on the captured image of fiducial marker; gridding the binarized image and dividing the binarized image to a plurality of end areas; encoding binarized values of each grid area as the identification information of the corresponding fiducial marker.

In one embodiment, analyzing the obtained image captured by visual sensor, the image is binarized according by adaptive threshold, and a contour of binarized image is extracted. Discarded the contour which is not square and has the size that is not within the predefined size range. Considered the contours which is square and has the size within a size range as fiducial marker. This process is the binarization process for captured image of fiducial marks to a binarized image.

Since the plane of the fiducial marker can be any angle with respect to the plane of a camera, it is necessary to perform a perspective transformation on the image of fiducial marker, so as to obtain a front view of the binarized image of the fiducial marks and then divided the front view of binarized image to several grid areas, and encoded the binarized values in the grid areas as the identification information of the fiducial marker. In one embodiment, after encoding, the encoded value is verified in the marker library to obtain the identification information of the corresponding fiducial marker.

In this step, after obtaining the pose information of the fiducial marker with respect to the visual sensor, the coordinate information of the fiducial marker with respect to the global coordinate system can be therefore obtained. In this embodiment, since the recognition of the fiducial marker is performed by the visual sensor so as to determine the relative pose of the fiducial marker, and the visual sensor can be equipped on the robot with any angle, it is necessary to consider the rotation angle of the visual sensor. That is, when the pose with respect to the visual sensor is transformed to the coordinate with respect to the origin of the global coordinate system, a rotation transformation is required. In one embodiment, a rotation transformation is performed on the pose information of fiducial marker from camera plane to the one with respect to the global coordinate system of robot map $m_{map} = (x_{map}, y_{map}, z_{map})$ by the following formula:

$$m_{map} = R_x(\theta z_{camera}) R_y(\theta y_{camera}) R_x(\theta x_{camera}) m_{camera};$$

where, the rotation matrix around the x-axis is:

$$R_x(\theta x_{camera}) = \begin{bmatrix} 1 & 0 & 0 \\ 0 & \cos\theta x_{camera} & -\sin\theta x_{camera} \\ 0 & \sin\theta x_{camera} & \cos\theta x_{camera} \end{bmatrix};$$

the rotation matrix around the y-axis is:

$$R_y(\theta y_{camera}) = \begin{bmatrix} \cos\theta y_{camera} & 0 & \sin\theta y_{camera} \\ 0 & 1 & 0 \\ -\sin\theta y_{camera} & 0 & \cos\theta y_{camera} \end{bmatrix}; \text{ and}$$

the rotation matrix around the z axis is:

$$R_z(\theta x_{camera}) = \begin{bmatrix} \cos\theta z_{camera} & -\sin\theta z_{camera} & 0 \\ \sin\theta x_{camera} & \cos\theta x_{camera} & 0 \\ 0 & 0 & 1 \end{bmatrix}.$$

The above-mentioned rotation transformation is calculated through the rotation matrix, and can also be calculated through rotation vectors or quaternions.

Figure 6:
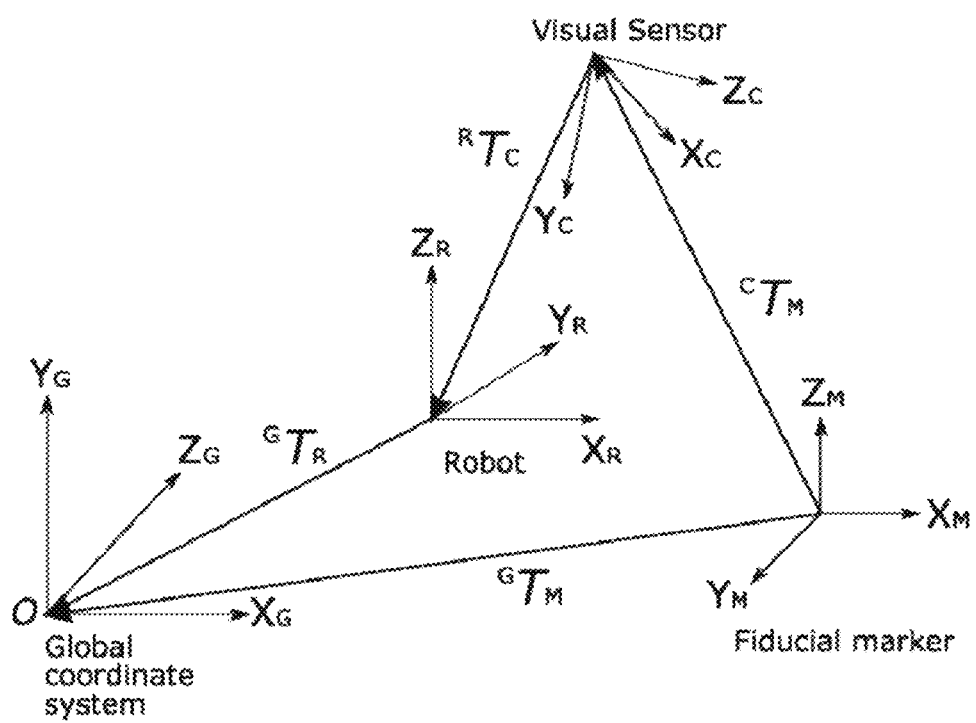
FIG. 6 is a schematic diagram of a coordinate system transformation from visual sensor coordinate system with respect to global coordinate system according to an embodiment of the present disclosure.

In this step, since the robot recognizes the fiducial marker at the initial position and the height of the visual sensor does not to move horizontally, it only needs to perform a rotation transformation to transform the pose from with respect to visual sensor to the one with respect to global coordinate system, yet performing a translational transformation is unnecessary. However if the height of the visual sensor changes horizontally, the obtained pose information with respect to global coordinate system needs to perform another translational transformation. In this step, not only the pose information of one fiducial marker can be obtained, and pose information of a plurality of fiducial markers can also be obtained simultaneously. FIG. 6 is a schematic diagram of a coordinate system transformation from visual sensor with respect to global coordinate system according to an embodiment of the present disclosure. The position of fiducial marker with respect to the global coordinate system $^{G}T_{M}$ can be achieved by the coordinate system with respect to visual sensor coordinate system as following equation:

$$^{G}T_{M}={}^{G}T_{R}{}^{*R}T_{C}{}^{*C}T_{M};$$

where $^{C}T_{M}$ represents the coordinates in fiducial marker coordinate system with respect to camera coordinate system, $^{R}T_{C}$ represents the coordinates in camera coordinate system with respect to robot coordinate system, $^{G}T_{R}$ represents the coordinates in robot coordinate system with respect to global coordinate system and * represents multiplication operation.

S103: moving the robot to a next position, recognizing the fiducial marker with at least one determined pose information and the fiducial marker with at least one undetermined pose information at the next position.

S104: obtaining pose information of the fiducial marker that has been undetermined with respect to the initial origin based on the pose information of fiducial marker that has been determined.

In the case that the motion area is large and the coordinate information of all the fiducial markers cannot be obtained at the initial position, the robot needs to move so as to recognize more fiducial markers. Hence, in step S103, the robot is moved to the next position, and recognizes the fiducial markers with undetermined pose information and at least one determined pose information of the fiducial marker. Then based on the trilateration principle, the step S104 that obtaining the undetermined pose information of the fiducial marker with respect to the origin of the global coordinate system by using the determined pose information of fiducial marker can be achieved.

In step S103, when recognizing the fiducial marker, actual information in 3D real world can be obtained based on the captured image. In one embodiment, firstly obtain the marker size of the determined fiducial marker in the captured image and also obtain the image position information of the undetermined pose information of fiducial marker with respect to the fiducial marker whose pose has been determined.

Then, compare the marker size of the fiducial marker whose pose has been calculated in image with the actual, marker size to obtain the transformation relationship. In this process, the actual marker size of fiducial marker disposed in the motion area is set, and by using the internal parameters and external parameters of the visual sensor including the focal length, projection center coordinate information and a distortion coefficient, the size information in the image recognized by the visual sensor is corresponded to the size in a real 3D space based on the pin-hole projection transformation principle, thereby obtaining the transformation relationship.

And then, actual position of the fiducial marker that undetermined pose information with respect to the fiducial marker that determined pose information is calculated based on the calculated transformation and the position information in image. Then by using the transformation relationship, the position information of the fiducial marker with undetermined pose information in the image with respect to the fiducial marker that determined pose information can be converted into the actual position information. That is, in real 3D physical space, relative pose information of the fiducial marker with the undetermined pose information with respect to the fiducial marker with the determined pose information.

Finally, the fiducial marker with undetermined pose information with respect to the origin of global coordinate system is obtained through the fiducial marker with determined pose information and its actual position information in real world based on the trilateration principle.

S105: repeating steps S103-S104 until the pose information of all the fiducial markers with respect to the initial origin are obtained.

S106: building up the map associated with fiducial markers based on the pose information of all the fiducial markers.

After obtaining the pose information of all the fiducial markers with respect to the initial origin of the global coordinate system of the robot based on the above-mentioned principle, the map associated with markers can be built up according to all the pose information, where the marker map is generated based on the initial position of the motion area.

Figure 7:
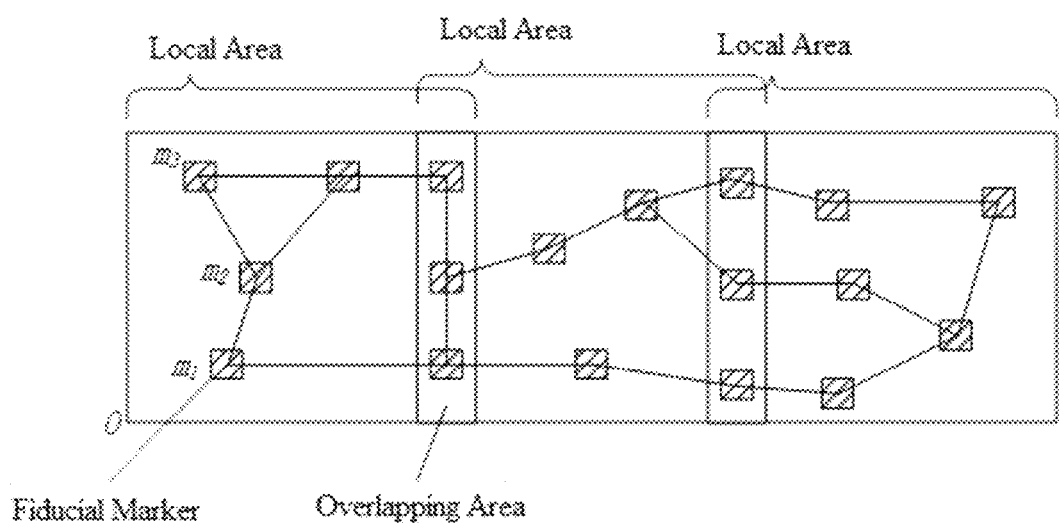
FIG. 7 is a schematic diagram of a marker map built up by the map generation method shown in FIG. 1.

FIG. 7 is a schematic diagram of a marker map built by the map generation method shown in FIG. 1. For the above-mentioned process, it can be understood in conjunction with FIG. 7. As shown in FIG. 7, in the motion area, the point O is the initial position, the fiducial marker $m_1$ and the fiducial marker $m_2$ are recognized at the initial position O, the pose information of the fiducial marker $m_1$ and the fiducial marker $m_2$ with respect to the initial position O is obtained, and then the robot is moved to the next position which can identify the fiducial marker $m_2$ and the fiducial marker $m_3$. In the recognition process, the actual position information of the fiducial marker $m_3$ with respect to the fiducial marker $m_2$ is determined, and then the pose information of the fiducial marker $m_3$ can be determined based on the pose information of the fiducial marker $m_2$ and the actual position information. After obtaining the pose information of all the fiducial markers through the process, the marker map shown in FIG. 7 can be built up.

In this embodiment, if the motion area of the map to be generated is too large, the motion area can be divided into a plurality of local areas according to the field of view of the visual sensor. After completing the map generation of on local area, the robot performs the map generation on next local area, thereby realizing the map generation for the entire motion area.

In which, each local area overlaps with its adjacent local areas, and at least two fiducial markers should be placed in the overlapping area. When generating the map for the overlapping area, it is necessary to ensure that there are at least two fiducial markers placed in the overlapping area which are within the field of view of the visual sensor simultaneously. Referring to FIG. 7, the motion area in FIG. 7 is divided into three local areas, the adjacent local areas have overlapping parts, and there are at least two fiducial markers in the overlapping area.

In this embodiment, the robot recognizes the fiducial marker through the visual sensor to realize the map generation. This method is based on visual sensor, which is low-cost the map generation process is simple, and the generated map associated with fiducial markers can be used to realize the localization and navigation of the robot.

After obtaining the marker map, since the map covers the pose information of all the fiducial markers, the robot can determine its own position based on the recognized fiducial markers, thereby achieving accurate localization and then navigation. During the localization process, the robot can be determined according to a single fiducial marker, hence it is possible to only retain part of the fiducial markers. Since the map generation process requires a plurality of fiducial markers, it is necessary to dispose more fiducial markers in the motion area. However, when performing localization or navigation, since the robot can localize itself by recognizing one fiducial marker, it is possible to dispose a small number of fiducial markers in the motion area.

Figure 8:
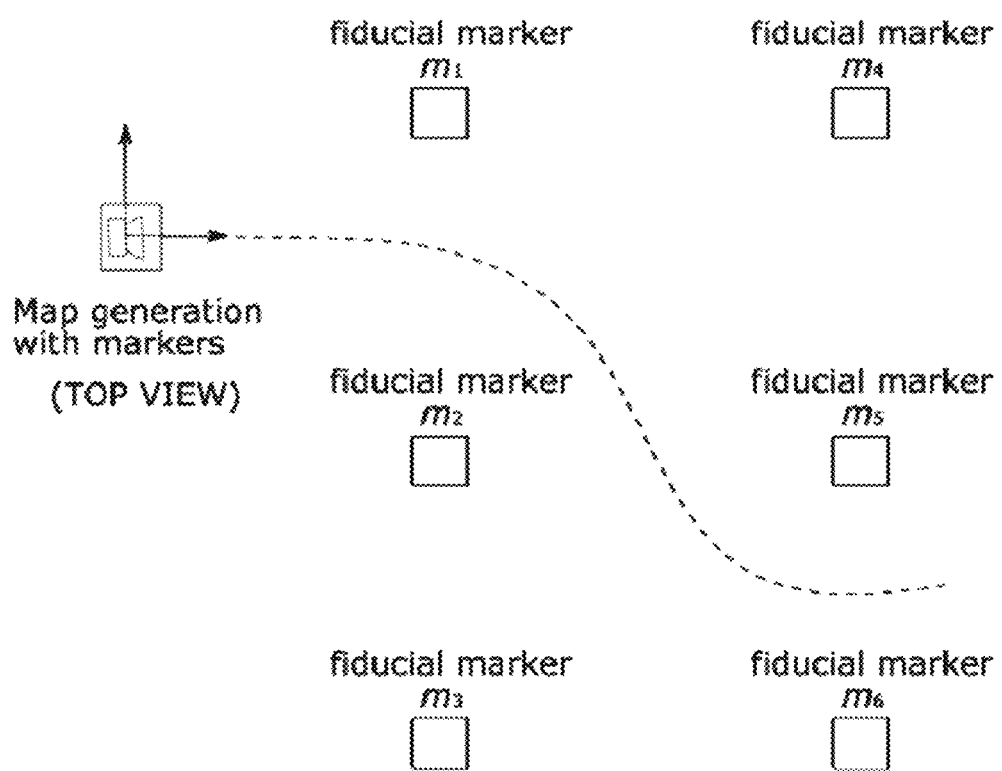
FIG. 8 is a schematic diagram of a map generation application example for a robot in a motion area according to an embodiment of the present disclosure.
Figure 9:
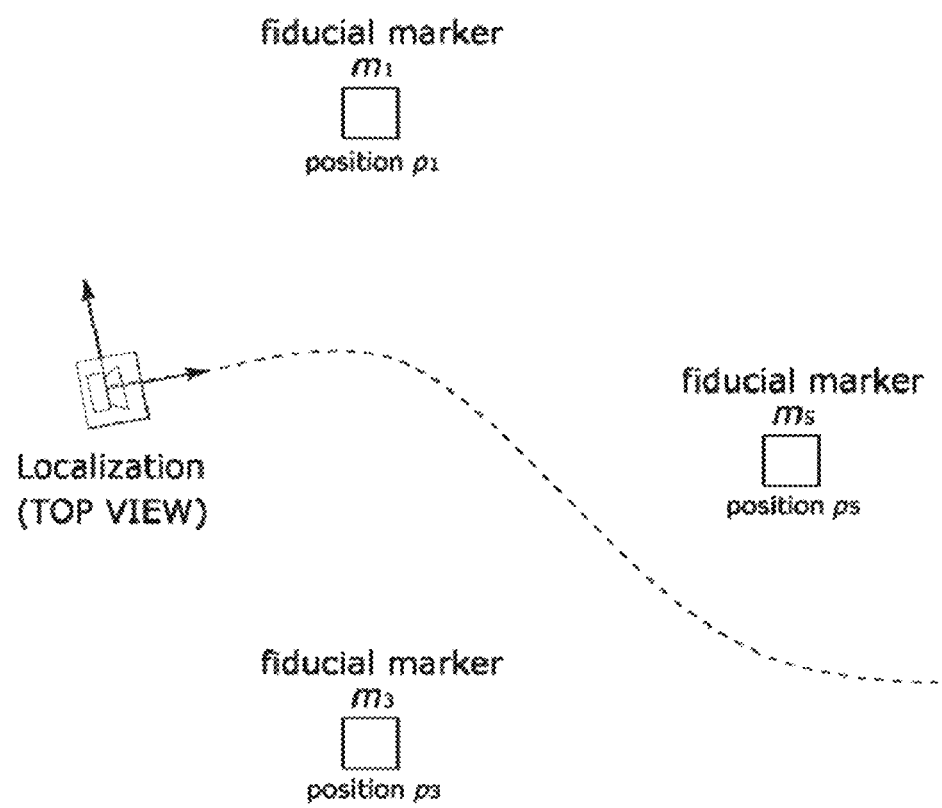
FIG. 9 is a schematic diagram of a localization application example for a robot in a motion area according to an embodiment of the present disclosure.

This is also conformed with the practical applications. For example, in an application for warehouse, when generating a map for a warehouse, multiple fiducial markers can be disposed in the warehouse, and when the robot autonomously cruise in the warehouse and needs to be determined, it may dispose only a small number of fiducial markers so as to avoid affecting the operations in the warehouse. For example, as shown in FIG. 8, six fiducial markers have been disposed on the motion area. Robot generates the map by above-mentioned method. After completing the map generation process, in localization process as shown in FIG. 9, when the robot cruises following the command from path planning, only three fiducial markers have been kept. In addition, in this case, the retained fiducial markers need to correspond to the fiducial markers disposed during the map generation process, for example, if the fiducial marker $m_1$ is located at the position $p_1$ when the map is generated, the fiducial marker $m_1$ must also be placed at the position $p_1$ during localization process and cannot be placed at other positions.

Figure 10:
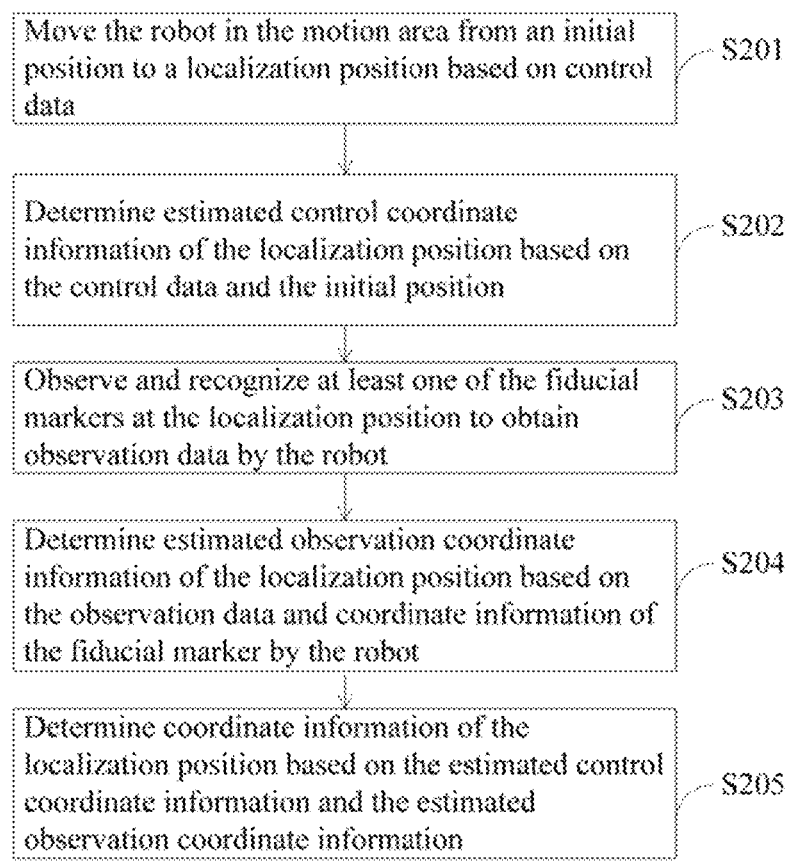
FIG. 10 is a flow chart of a localization method for a robot in a motion area according to an embodiment of the present disclosure.
Figure 11:
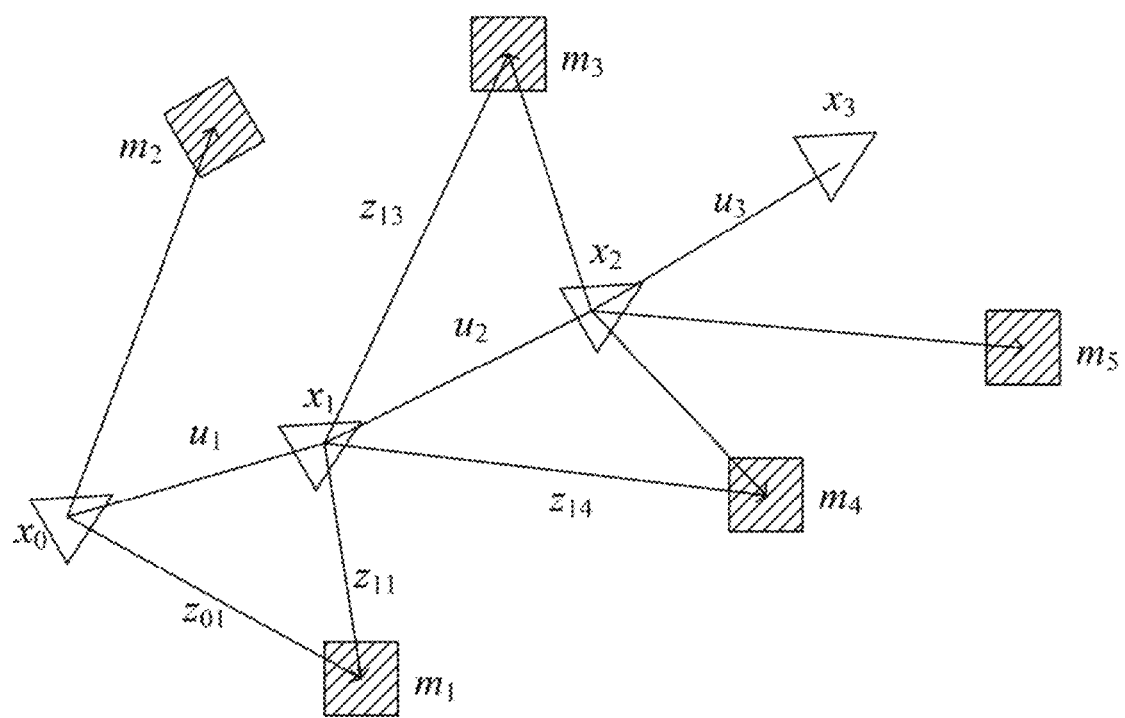
FIG. 11 is a schematic diagram of a robot localization in a motion area in the localization method shown in FIG. 10.

For the localization process of the robot, please refer to FIG. 10 and FIG. 11, FIG. 10 is a flow chart of a localization method for a robot in a motion area according to an embodiment of the present disclosure. FIG. 11 is a schematic diagram of a robot localization in a motion area in the localization method shown in FIG. 10. The following description of each step is in conjunction with the case shown in FIG. 11, and thus the reference numerals are only examples and are not intended to be a limitation. In this embodiment, the method is a computer-implemented method executable for a processor. As shown in FIG. 10 and FIG. 11, the methods include the following steps.

S201: moving the robot in the motion area from an initial position to a localization position based on control data.

In this embodiment, the fiducial markers ($m_1$, $m_2$, $m_3$, $m_4$, $m_5$, $m_6$) are disposed in the motion area, and the robot has obtained the marker map of the motion area with respect to the disposed fiducial marker, hence the position information of all the fiducial markers is also known. In this step, the robot starts to move from the initial position, where the initial position may be the origin of the global coordinate system which is corresponding to the marker map. In this case, the position information $x_0$ of the initial position is known. In addition, the initial position can also be an initial position of the robot itself. In this case, the position information $x_0$ of the initial position is determined based on the recognized fiducial marker.

Figure 12:
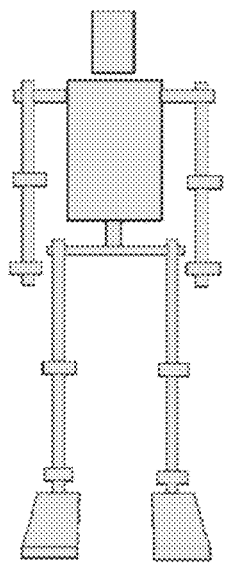
FIG. 12 is an example of humanoid robot and its coordinate system according to an embodiment of the present disclosure.
Figure 12:
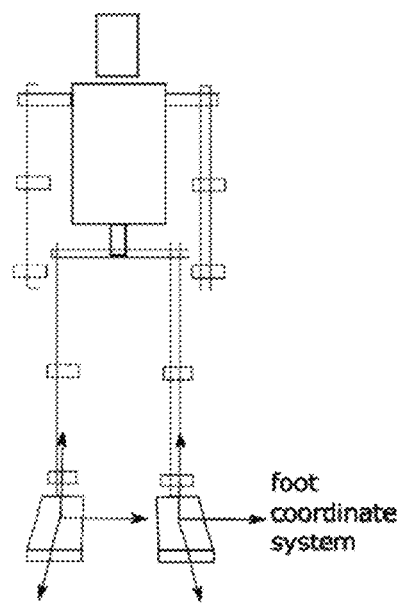
Figure 13:
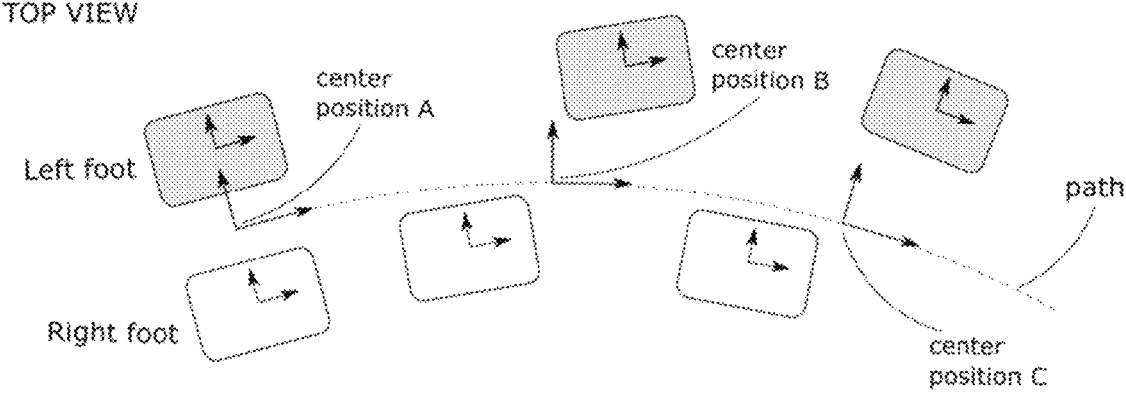
FIG. 13 is example of footprints of humanoid biped robot with both feet according to an embodiment of the present disclosure.
Figure 13:
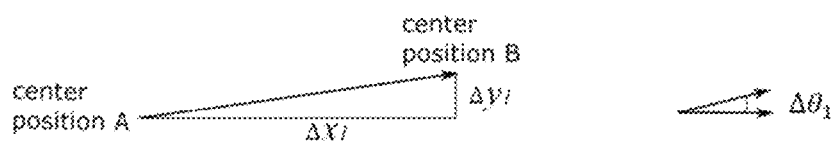
Figure 13:
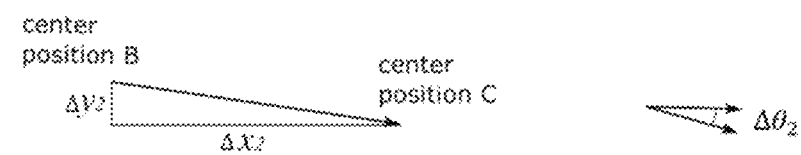

In this step S201, the robot is moved from the initial position in the motion area to the localization position according to the control data $u_1$, and the control data $u_1$ can be the input according to a preset planning path, or may also be preset control data, where the input control data includes a translational movement amount ($\Delta x$, $\Delta y$) and a rotation angle $\Delta\theta$ of the robot. For different robots, the input control data is also different. For example, for the wheeled robot, the input control data includes the movement coordinates and the rotation angles for moving from the initial position to the targeting position; for the humanoid robot, the control data includes a translational movement amount ($\Delta x$, $\Delta y$) and a rotation angle $\Delta\theta$ of the footprint of the humanoid robot, or includes a gait planning which represents a series of the targeting footprints of left and right foot of the human robot which can be represented as a series of movement amount ($\Delta x$, $\Delta y$) and rotation angles $\Delta\theta$. The control input can be used as odometer information for localization. FIG. 12 is an example of but avoid robot and its coordinate system according to an embodiment of the present disclosure. FIG. 13 is a schematic diagram example of footprint coordinate system for humanoid robot in gait planning. Both feet have its own foot coordinate system and the center position is the center of left foot and right foot according to an embodiment of the present disclosure. When humanoid robot walks from center position A to center position B with the translational movement amount ($\Delta x_1$, $\Delta y_1$) and rotation angle $\Delta\theta_1$. Assume the coordinates of center position A with respect to the global coordinate system has been determined as above-mentioned method. The position of A is ($X_A$, $Y_A$) and orientation angle is $\theta_A$. The coordinates of center position B can be achieved as ($X_A+\Delta x_1$, $Y_A+\Delta y_1$) and orientation angle of B is ($\theta_A+\Delta\theta_1$). The coordinates of center position C can be also obtained, as position ($X_B+\Delta x_2$, $Y_B+\Delta y_2$) and orientation angle ($\theta_g+\Delta\theta_2$).

In this embodiment, since the fiducial marker which associated with a marker pose is required to help localize the robot, it is necessary to ensure that the robot can observe and recognize at least one fiducial marker when it is moved to the another position that needs to obtain its estimated position.

S202: determining estimated control coordinate information of the localization position based on the control data and the initial position.

In the case that the initial position coordinate information $x_0$ is known, the coordinate information $x_1=(x_0+\Delta x_0, y_0+\Delta y_0)$ and the rotation angle $\theta_1=\theta_0+\Delta\theta$ of the localization position can be estimated based on the control data $u_1=(\Delta x_0, \Delta y_0)$, the rotation angle $\Delta\theta$, and the initial position coordinate information $x_0$, that is, coordinate information $x_1=(x_0+\Delta x_0, y_0+\Delta y_0)$ and the rotation angle $\theta_1=\theta_0+\Delta\theta$. At this time, the obtained coordinate information is referred to as the estimated control coordinate information $(x_1|u_1)$, that is, the currently estimated coordinate values. Since the calculated coordinate information based on the control data has uncertainty, it is necessary to further correct the estimated control coordinate information. In this embodiment, the coordinate information is corrected according to the fiducial marker.

S203: observing and recognizing at least one of the fiducial markers at the localization position to obtain observation data by the robot.

Taking they case of recognizing one fiducial marker as an example, the robot recognizes the fiducial marker $m_1$ at the localization position $x_1$ to obtain the observed data $z_1$. The observed data includes the identification number of fiducial markers, the identification information of the fiducial marker, and the pose information of the fiducial marker with respect to a camera.

S204: determining estimated observation coordinate information of the localization position based on the observation data and pose information of the fiducial marker by the robot.

The robot determines the estimated observation coordinate information $(x_1|z_1)$ of the localization position based on the observation data $z_1$ and the pose information $m_1$ of the fiducial marker.

S205: determining coordinate information of the localization position based on the estimated control coordinate information and the estimated observation coordinate information.

Finally, the coordinate information $x_1$ of the localization position can be updated by combining the estimated control coordinate information $(x_1|u_1)$ and the estimated observation coordinate information $(x_1|z_1)$.

In this embodiment, the above-mentioned steps S202-S205 implement the calculation of the coordinate information $x_1$ based on the Bayesian estimation algorithm, that is, the recursive calculation is performed in consideration of the uncertainty of each parameter.

In one embodiment, in step S202, a control uncertainty $P(x_1|u_1, z_0)$ of the estimated control coordinate information of the localization position is obtained based on an uncertainty $P(x_1|x_0, u_1)$ of the control data and an uncertainty $P(x_0|u_0, z_0)$ of the initial position coordinate information.

The control uncertainty is calculated by the following formula:

$$P(x_1|u_1,z_0)=\int P(x_1|x_0,u_1) \times P(x_0|u_0,z_0)dx_0.$$

The initial position coordinate information may be the origin position of the global coordinate system of the marker map, and thus is determined. In this case, the uncertainty $P(x_0|u_1, z_0)$ of the coordinate information of the initial position may be a preset value. If the coordinate information of the initial position is obtained based on the recognition of the fiducial marker, the uncertainty of the coordinate information of the initial position in this case is the uncertainty of the observation data when the fiducial marker is recognized, and the uncertainty of the observation data can be estimated with a zero mean uncorrelated the Gaussian distribution.

When the robot recognizes the fiducial markers at the localization position, it also inherits the uncertainty $P(z_1|x_1, m)$ from the observation data based on the uncertainty model of the observation data, for example, the probability distribution of observation data. If one fiducial marker is recognized, the uncertainty of the observation data is described as one-dimensional Gaussian normal probability distribution. If multiple fiducial markers are observed, the uncertainty of the observation data can be described as the two-dimensional Gaussian normal distribution. Based on the uncertainty of the observed data, the observation uncertainty of the estimated observation coordinate information can be obtained.

The control uncertainty indicates the reliability of the estimated control coordinate information obtained based on the control data. The larger the uncertainty is, the smaller the reliability is. The control uncertainty is determined by the accuracy of a gait control model of the robot. Similarly, the observation uncertainty indicates the reliability of the estimated observation coordinate information obtained based on the observed data. The larger the uncertainty is, the smaller the reliability is. The uncertainty of the observation data is determined by the accuracy of the observation model, that is, the accuracy of the sensor and the complexity of the surrounding environments. Therefore, based on the uncertainty, influence ratios of the estimated control coordinate information and the estimated observation coordinate information working on the coordinate information of the localization position can be obtained respectively. If the uncertainty of the estimated control coordinate information is large, the reliability is small, and the influence ratio of the estimated control coordinate information in the finally obtained coordinate information is the small. For the same reason, if the uncertainty of the estimated control coordinate information is small, the influence ratio is large.

According to the principle, the influence ratios of each of the estimated control coordinate information and the estimated observation coordinate information on the coordinate information of the localization position is calculated, and then the coordinate information of the localization position can be obtained.

After determining the coordinate information of a localization position $x_1$ at time frame n, the robot is continued to move to the next localization position $x_2$ to obtain the coordinate information of the next localization position $x_2$ at time frame n+1. Therefore, when performing the above-mentioned calculation, a posterior conditional probability of the state (position) at time frame n+1 is obtained by using the control data of the time frame n and the fiducial marker information observed at time frame n based on the Bayes estimation algorithm, thereby obtaining the uncertainty of the estimated coordinate information of the localization position $x_1$ and the rotation angle $\theta_1$.

In the above-mentioned process, in order to improve the localization precision, that is, the accuracy of the coordinate information, it is may further configure that the observed fiducial marker at the previous position can be observed and recognized when moved to the next position, so as to determine the observation data of the fiducial marker at the next position based on the observation data of the fiducial marker at the previous position. For example, the fiducial marker $m_2$ is observed at the position $x_1$, and the fiducial marker $m_2$ can also be observed at the next position $x_2$. In this case, the calculation process of all the uncertainties is as follows.

The uncertainty of the localization position $x_1$ is: $P(x_1, m_2|u_1, z_1)$;

based on the control data $u_2$, the uncertainty of the estimated control coordinate in when moves to the position $x_2$ is:

$$P(x_2,m_2|u_2,z_1)=\int P(x_2|x_1,u_2) \times P(x_1,m_2|u_1,z_1)dz_1;$$

the uncertainty of the estimated observation coordinate information is determined based on the uncertainty of the observed data $z_2$, which includes:

$$P(z_2|x_2,m_2) \text{ and } P(z_2|z_1,u_2);$$

then the control uncertainty and the observation uncertainty are calculated to obtain the uncertainty of the coordinate information of the localization position $x_2$ and the rotation angle $\theta_2$:

$$P(x_2, m_2 | u_2, z_2) = \frac{P(z_2 | x_2, m_2)P(x_2, m_2 | u_2, z_1)}{P(z_2 | z_1, u_2)}$$

Figure 14:
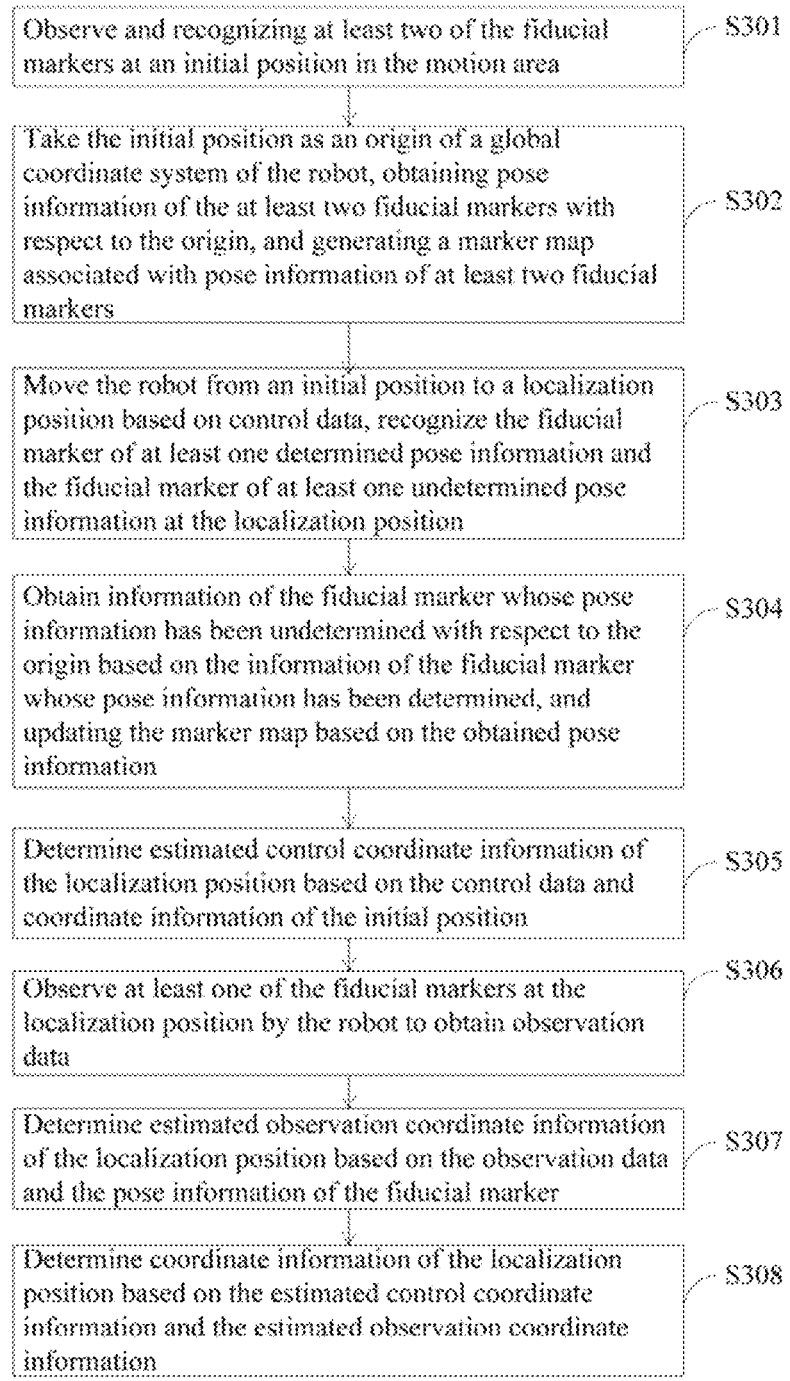
FIG. 14 is a flow chart of a simultaneous localization and map generation method for a robot in a motion area according to an embodiment of the present disclosure.

Based on the above principle, the localization of the robot in the entire motion area can be obtained. The robot can also combine the above-mentioned map generation and localization methods to realize simultaneous localization and mapping. That is, when the robot is moved into an unfamiliar area, simultaneous localization and mapping can be performed based on the configured fiducial marker. For details, please refer to FIG. 14. FIG. 14 is a flow chart of a simultaneous localization and mapping method for a robot in a motion area according to an embodiment of the present disclosure. In this embodiment, the method is a computer-implemented method executable for a processor. As shown in FIG. 14, the method includes the following steps.

S301: observing and recognizing at least two of the fiducial markers at an initial position in the motion area.

S302: taking the initial position as an origin of a global coordinate system of the robot, obtaining pose information of the at least two fiducial markers with respect to the origin, and generating a marker map associated with pose information of at least two fiducial markers.

In this embodiment, the coordinate system generated marker map is coincidence with the global coordinate system of the robot. When performing the simultaneous localization and the mapping through the robot, the origin of the movement of the robot is used as the origin of the global coordinate system of the robot, that is, the origin of the generated map.

S303: moving the robot from an initial position to a localization position based on control data, recognizing the fiducial marker of at least one determined pose information and the fiducial marker of at least one undetermined pose information at the localization position.

S304: obtaining information off the fiducial marker whose pose information has been undetermined with respect to the origin based on the information of the fiducial marker whose pose information has been determined, and updating the marker map based on the obtained pose information.

In this embodiment, the update of the marker map is performed according to the principle in the above-mentioned mapping embodiment first, and then the localization is performed based on the updated marker map. The localization is implemented by the following steps.

S305: determining estimated control coordinate information of the localization position based on the control data and coordinate information of the initial position.

S306: observing at least one of the fiducial markers at the localization position by the robot to obtain observation data.

S307: determining estimated observation coordinate information of the localization position based on the observation data and the pose information of the fiducial in marker.

S308: determining coordinate information of the localization position based on the estimated control coordinate information and the estimated observation coordinate information.

In this embodiment, the steps are similar to the steps in the above-mentioned embodiment, and are not described herein. In addition, the fiducial markers recognized in above-mentioned localization steps S305-S308 are the ones whose pose information were determined in map generation steps S301-S304. This embodiment can realize the localization and the mapping simultaneously associated with the fiducial markers.

Figure 15:
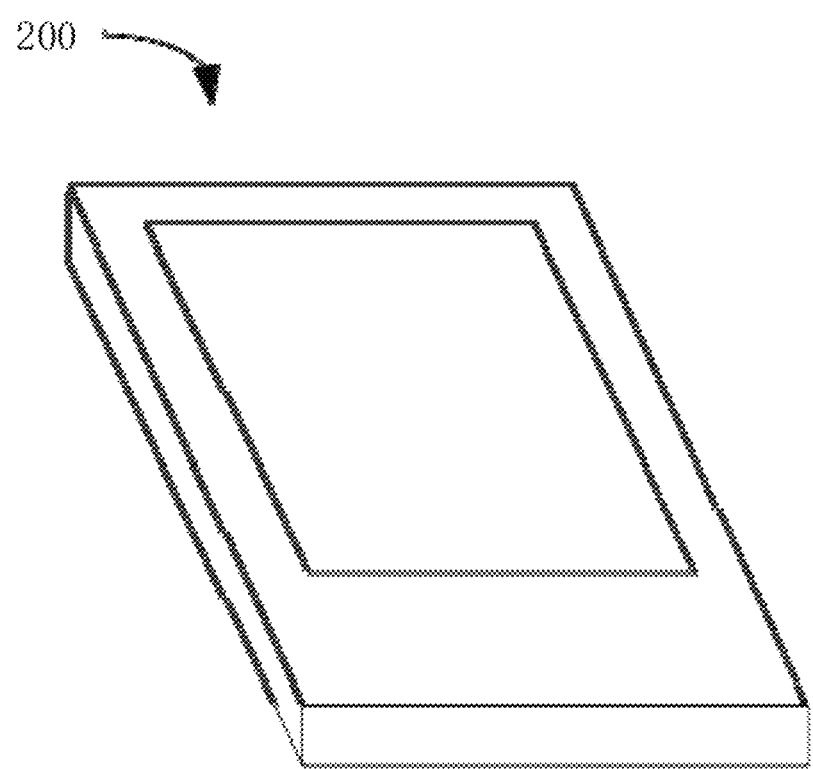
FIG. 15 is a schematic diagram of the structure of a computer readable storage medium according to an embodiment of the present disclosure.

For a computer program, when it is implemented in software and sold or used as a stand-alone product, which can be stored in a computer readable storage medium. The present disclosure also provides a computer readable storage medium stored with a computer program, where the program can be executed by a processor to implement the steps of the above-mentioned methods. FIG. 15 is a schematic diagram of the structure of a computer readable storage medium according to an embodiment of the present disclosure. As shown in FIG. 15, a computer readable storage medium 200 may be, for example, a USB flash drive, an optical disk, a server, or the like.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented localization method, for a mobile robot in a motion area, wherein the motion area is provided with a plurality of fiducial markers, the method comprises:
    providing a robot comprising a processor and a visual sensor electrically coupled to the processor, wherein the visual sensor is configured to capture an image; and
    the method further comprises executing on the processor the steps of:
    moving the robot in the motion area from an initial position to a localization position based on control data;
    determining estimated control coordinate information of the localization position based on the control data and coordinate information of the initial position;
    observing and recognizing at least one of the fiducial markers at the localization position based on the image as by the visual sensor to obtain observation data;
    determining estimated observation coordinate information of the localization position based on the observation data and coordinate information of the fiducial marker; and
    determining coordinate information of the localization position based on the estimated control coordinate information and the estimated observation coordinate information.

2. The method of claim 1, further comprising:
    obtaining a control uncertainty of the estimated control coordinate information of the localization position based on an uncertainty of the control data and an uncertainty of the initial position coordinate information;
    obtaining an observation uncertainty of the estimated observation coordinate information based on an uncertainty of the observed data; and
    obtaining influence ratios of each of the estimated control coordinate information and the estimated observation coordinate information on the coordinate information of the localization position based on the control uncertainty and the observation uncertainty to calculate the coordinate information of the localization position based on the influence ratios.

3. The method of claim 2, wherein the step of observing and recognizing the at least one of the fiducial markers at the localization position based on the image captured by the visual sensor to obtain the observed data comprises:
    recognizing the at least one of the fiducial markers at the localization position based on the image captured by the visual sensor to obtain the observation data, and determining an uncertainty of the observation data based on a zero mean uncorrelated Gaussian distribution.

4. The method of claim 2, further comprising:
    calculating the control uncertainty and the observation uncertainty based on a Bayesian estimation algorithm to obtain an uncertainty of the coordinate information of the localization position.

5. The method of claim 2, wherein the robot is a humanoid robot, and the control data includes a translational coordinate amount and a rotation angle of a gait footprint of the humanoid robot, or includes a series of translation coordinates and rotation angles of left and right foot's target footprints of the humanoid robot.

6. The method of claim 1, wherein the observation data comprising identification number of the fiducial markers, identification information of the fiducial marker, and pose information of the fiducial marker with respect to the visual sensor.

7. The method of claim 1, wherein before the step of moving the robot in the motion area from the initial position to the localization position based on control data, the method further comprises:

observing and recognizing at least two of the fiducial markers at the initial position in the motion area based on an image captured by the visual sensor; and taking the initial position as an initial origin of a global coordinate system al the robot, obtaining pose information of the at least two fiducial markers with respect to the initial origin, and generating a marker map associated with pose information of at least two fiducial markers; and after the step of moving the robot in the motion area from the initial position to the localization position based on the control data, the method further comprises:

recognizing the fiducial marker of at least one determined pose information and the fiducial marker of at least one undetermined pose information at the localization position based on the image captured by the visual sensor; and obtaining information of the fiducial marker with the undetermined pose information with respect to the initial origin based on the information of the fiducial marker with the determined pose information, and updating the marker map based on the obtained coordinate information.

8. The method of claim 7, wherein the step of generating the marker map associated with the pose information of at least two fiducial markers comprises:

moving the robot to a next position, recognizing the fiducial marker of at least one determined pose information and the fiducial marker of at least one undetermined pose information at the next position based on an image captured by the visual sensor, and obtaining pose information oldie undetermined fiducial marker with respect to the initial origin based on the determined pose information of the determined fiducial marker;

repeating the previous step until the pose information of all the fiducial markers with respect to the initial origin are obtained; and generating the marker map associated with fiducial markers based on the pose information of all the fiducial markers.

9. The method of claim 8, wherein the step of recognizing the fiducial marker of the at least one determined pose information and the fiducial marker of the at least one undetermined pose information at the next position based on the image captured by the visual sensor comprises:

obtaining an image marker size of the fiducial marker of the at least one determined coordinate information, and image position information of the fiducial marker of the at least one undetermined coordinate information with respect to the fiducial marker of the at least one determined coordinate information based on the image captured by the visual sensor;

comparing the image marker size and an actual marker size of the fiducial marker of the at least one determined coordinate information to obtain a transformation relationship; and calculating actual position information of the fiducial marker of the at least one undetermined coordinate information with respect to the fiducial marker of the at least one determined coordinate information based on the transformation relationship and the image position information;

the step of obtaining the pose information of the undetermined fiducial marker with respect to the initial origin based on the determined pose information of the determined fiducial marker comprises:

obtaining the fiducial marker with undetermined coordinate information with respect to the initial origin based on the fiducial marker of the determined coordinate information and the actual position information.

10. The method of claim 8, wherein the step of observing and recognizing the at least two of the fiducial markers at the initial position in the motion area based on the image captured by the visual sensor, or the step of moving the robot to the next position, recognizing the fiducial marker of the at least one determined pose information and the fiducial marker of the at least one undetermined pose information at the next position based on the image captured by the visual sensor comprises:

performing a binarization processing on an image of the fiducial marker captured by the visual sensor based on the image captured by the visual sensor;

gridding the binarized image and dividing the binarized image to a plurality of grid areas; and encoding binarized values of each grid area as identification information of the corresponding fiducial marker.

11. The method of claim 7, wherein the step of observing and recognizing the at least two of the fiducial markers at the initial position in the motion area based on the image captured by the visual sensor comprises:

observing and recognizing the at least two of the fiducial markers in the motion area, and obtaining pose information of the at least two fiducial markers with respect to the visual sensor, based on the image captured by the visual sensor; and the step of obtaining the pose information of the at least two fiducial markers with respect to the initial origin comprises:

obtaining coordinate information of the fiducial marker with respect to the initial origin based on the pose information of the at least two fiducial markers with respect to the visual sensor.

12. The method of claim 11, wherein the fiducial marker is a square, and the step of obtaining, the pose information of the at least two fiducial markers with respect to the visual sensor based on the image captured by the visual sensor comprises:

recognizing four vertices of at least two fiducial markers based on the image captured by the visual sensor to determine a center point of the plurality of fiducial markers; and obtaining pose information of the center point of the plurality of fiducial markers with respect to the visual sensor to take as the pose information of the plurality of fiducial markers with respect to the visual sensor.

13. The method of claim 7, wherein the motion area comprises a plurality of local areas, wherein the adjacent local areas overlap with each other at an overlapping area, and the overlapping area comprises at least two fiducial markers, the method further comprises:

generating the marker map of the plurality of local areas in sequence; and generating the marker map of the motion area based on the marker maps of the plurality of local areas.

* * * * *